Oct. 28, 1958 C. V. GIAIMO ET AL 2,858,087
BRAKE FOR FISHING REEL
Filed Sept. 1, 1954 2 Sheets-Sheet 1

INVENTORS
CHARLES V. GIAIMO
BY LAWRENCE COWEN
ATTORNEY

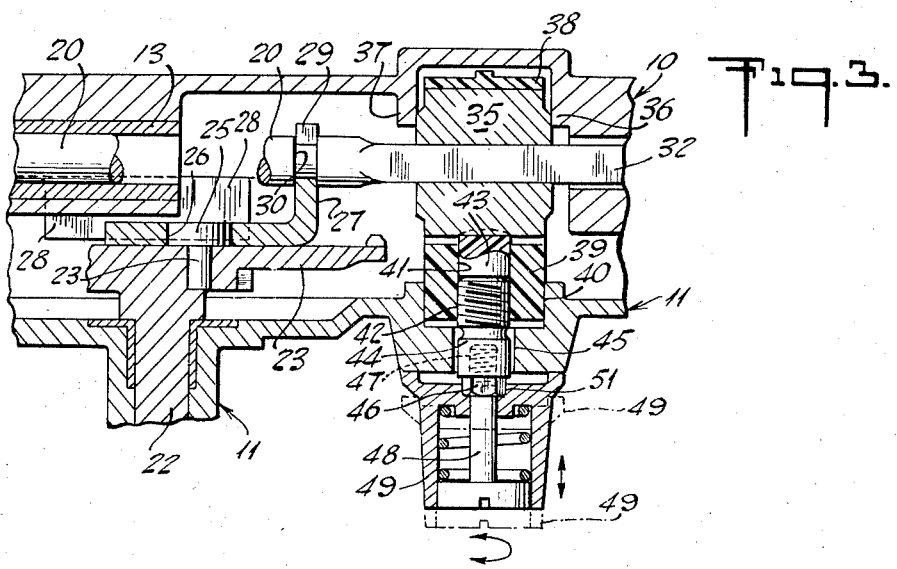
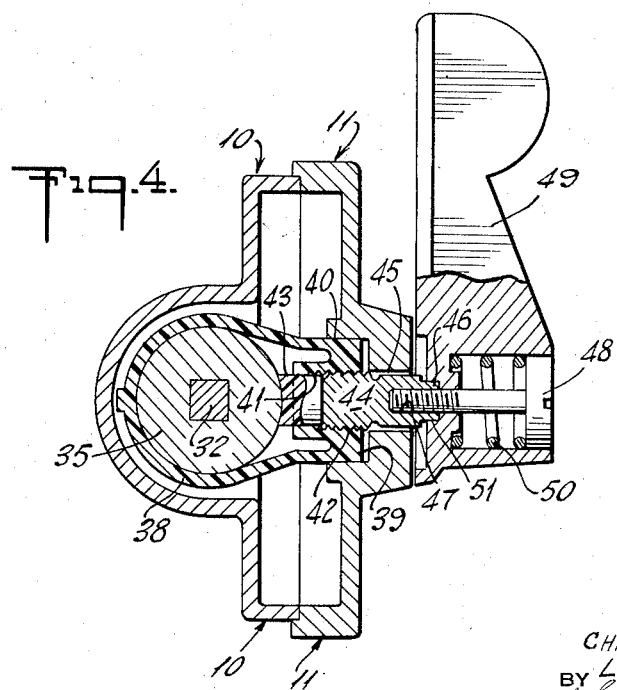

United States Patent Office 2,858,087
Patented Oct. 28, 1958

2,858,087
BRAKE FOR FISHING REEL

Charles V. Giaimo, South Orange, N. J., and Lawrence Cowen, New York, N. Y., assignors to The Lionel Corporation, New York, N. Y., a corporation of New York Application September 1, 1954, Serial No. 453,622

5 Claims. (Cl. 242—84.21)

The present invention relates to fishing reels and is directed more particularly towards fishing reels of the spinning reel type.

The use of free spools and star drags is common in reels of the type in which the line is wound directly on a revolving spool. In spinning reels in common use the line is laid on a reciprocatory spool by a revolving spool cup and an adjustable friction brake, between the line-winding spool and a non-rotatable, reciprocable spool shaft, determines the line tension necessary to turn the spool so that the line may be pulled off the same. Such spools are not free to revolve except by release of the brake.

The present invention contemplates spinning reels in which the spool shaft is secured to the spool so as to reciprocate the spool and rotate with it, and the rear end of the spool shaft and adjacent parts of the housing are provided with cooperable devices providing an adjustable friction brake by which the line tension can be retained when the brake is on and by which it is possible to release the brake so that the spool is then free to revolve with substantially no friction drag.

It is a further object of the present invention to so arrange the friction brake mechanism that the user can make an adjustment, analogous to that made by the star drag mechanism, so as to predetermine the maximum braking effort applied to the line. The user can then shift a manually operable device to completely release the brake mechanism so that the reel is free and to then, without making any readjustment of the brake itself, restore the manually operable device to a position to regain the desired line tension.

The accompanying drawings show for purposes of illustrating the present invention one embodiment in which the invention may take form, it being understood that the drawings are illustrative of the invention rather than limiting the same.

In the accompanying drawings:

Figure 3 is a fragmentary enlarged sectional view on the same plane as Figure 2; and Figure 4 is a transverse sectional view on the line 4—4 of Figures 2 and 3.

Figure 1:
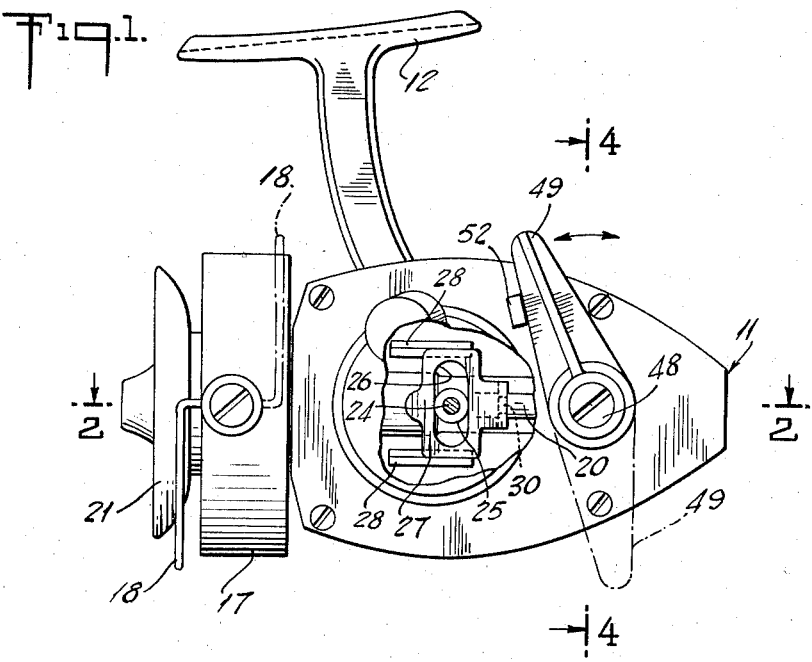
Figure 1 is a side elevational view of the reel with parts broken away to show interior construction.
Figure 2:
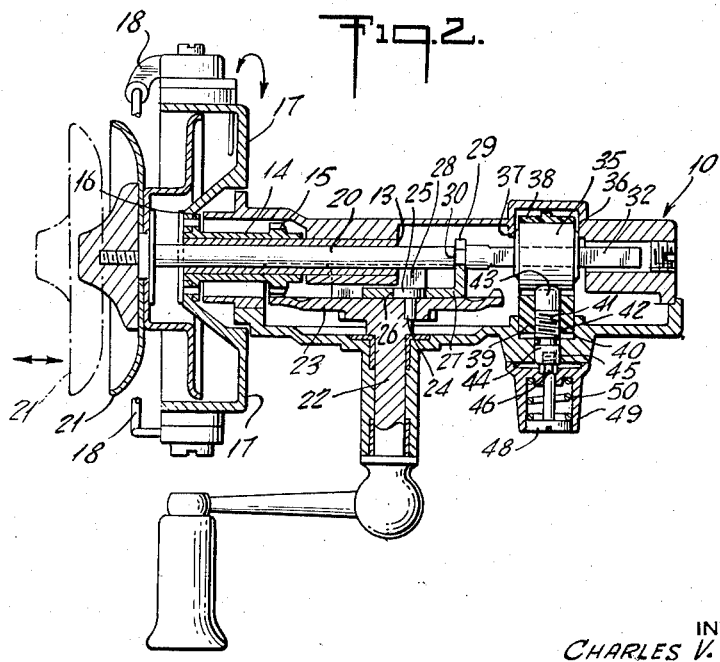
Figure 2 is a longitudinal sectional view on the line 2—2 of Figure 1.

The present reel has a two-part housing including a body member 10 and a cover member 11 which are secured together to form a gear chamber. The housing member 10 has a reel seat 12 to facilitate securing the reel to a fishing rod. The body member 10 carries a bushing 13 on which is mounted a sleeve 14 provided with gear teeth 15. The left or front end of the sleeve 14 is, as indicated at 16, secured to a spool cup 17. The spool cup carries a pick-up finger or bail 18 adapted to be shifted back and forth between the line-winding position indicated in full lines and line released position indicated in dotted lines. The line pick-up or bail is manually shifted to the dotted line position to free the line for casting, and is automatically shifted by well known mechanism to the full line position when the line winding operation commences.

The bushing 13 slidably and rotatably receives a spool shaft 20 which is fixably secured to a line winding spool 21 so as to revolve with it and to reciprocate it. The cover member 11 carries a crank shaft 22 and driving gear 23 in mesh with the pinion 15. The gear 23 carries a pin 24 and roller 25. The roller is received in a slot 26 extending crosswise of a yoke 27. The yoke 27 is reciprocably guided by fins or ribs 28 extending downwardly from the body member 10. It has an upwardly extending slotted portion 29 received in a groove 30 in the shaft 20. When the crank shaft 22 is revolved the yoke 27 is reciprocated and carries the spool shaft 20 and spool 21 back and forth.

The rear end 32 of the spool shaft 20 is squared as indicated more clearly in Figure 4. It passes through a brake drum 35. This brake drum is disposed between abutments or stops 36 and 37 on the housing part 10 so that it cannot slide along its axis. The brake drum 35 is within a brake band 38, preferably made of molded nylon. The brake band has a boss or extension 39 which enters a recess 40 in the cover member 11 so that the brake band is held against rotation relative to the axis of the shaft 20. The extension 40 of the brake band has a radial bore hole 41 threaded near the outer end, as indicated at 42. This bore hole receives a brake shoe member 43 and a threaded shaft 44. The brake member is adapted to bear on the surface of the brake drum 35 while the threaded member 44 extends out through an opening 45 in the cover 11. The outer end of the threaded member 39 is made polygonal, as indicated at 46, so as to resemble the outside of a nut. The threaded member 44 is counter-bored, as indicated at 47, to receive a screw 48. This screw forms a shaft for a handle or fingerpiece 49 which is urged toward the cover member 11 by coiled spring 50. This handle has a polygonal recess 51 adapted to fit about the nut-like end 46 of the threaded member 39. The threads on the brake band 38 and the threaded member 39 are left-hand threads so that when the handle 49 is shifted in a counter-clockwise direction against the stop 52, the plunger of brake shoe 43 is pressed against the drum to the maximum extent permitted by the then adjustment of the fingerpiece 28 on the threaded member 39.

With the construction above described, it is possible for the user to pull the handle away from the cover, as indicated by the dot and dash lines on Figure 3, so as to free it from the nut-like extension 46, and can then turn it slightly. The spring will then reseat it in a new position and thereby make it possible to have the handle at varying angular positions relative to the threaded member 39. It is thus possible to have a number of different maximum settings for the brake mechanism, when the handle is brought against the stop. When the user desires to release the friction drag it is merely necessary to shift the fingerpiece an amount sufficient to release the brake. The reel then acts as a free spool reel, and any pull on the line will revolve the spool and spool shaft. The user may immediately regain control of the line at the present drag by shifting the fingerpiece against the stop.

In the drawings the click and antireverse mechanism are omitted for simplicity.

Since it is obvious that the invention may be embodied in other forms and constructions within the scope of the claims, we wish it to be understood that the particular form shown is but one of these forms, and various modifications and changes being possible, we do not otherwise limit ourselves in any way with respect thereto.

What is claimed is:

1. A spinning reel comprising a housing adapted to be secured to a fishing rod, a spool cup rotatably carried by the front end of the housing, a pinion drivingly connected to the spool cup, a coaxial spool shaft rotatably and reciprocably carried by the housing and carrying at its front end a spool in the spool cup, a line winding finger carried by the spool cup, a driving gear carried by the housing for rotation about an axis at right angles to the spool cup axis and drivingly connected with the pinion, gear operated means for reciprocating the shaft back and forth, the rear end of the shaft extending rearwardly beyond the driving gear, a cylindrical brake drum mounted on the rear end of the shaft for rotation therewith, housing carried means for confining the drum against reciprocation with the shaft, and a housing carried, adjustable, friction brake acting on the drum to variably control line tension sufficient to unwind line off the spool, said adjustable brake including a band about the drum and non-rotatably secured in the housing, a band carried brake shoe, and means to shift the brake shoe radially relative to the drum, the brake shoe shifting means including a shaft threadedly carried by the brake band and having one end bearing on the brake shoe and the other end protruding from the housing, and an externally accessible handle for oscillating the threaded shaft and actuating the brake shoe toward and away from the brake drum.

2. A spinning reel as claimed in claim 1, wherein the shaft and handle are provided with means for locating the threaded shaft in variant angular positions relative to the handle so that selected line tension may be maintained with the handle in the same angular position.

3. In a spinning reel, a spool cup, a spool, gear means for rotating the spool cup, a spool shaft coaxial with the spool cup and carrying the spool at its front end, a spool cup carried line winding finger for winding line on the spool, the spool shaft being reciprocably and rotatably carried with respect to the spool cup and extending beyond the gear means, gear operated means for reciprocating the spool and spool shaft when the spool cup is rotated, and an adjustable friction brake cooperable with the rear of the spool shaft, and including a drum rotatable with the shaft and in which it slides, a brake band, a band carried brake shoe, a band carried threaded member for shifting the brake shoe, and a manually accessible device for turning the threaded member to control the brake pressure.

4. A line tension control for spinning reels comprising a line receiving spool on which line may be wound by a rotatable line winder without rotating the spool, a spool shaft revolvable with the spool, a housing in which the spool shaft is mounted for rotation and reciprocation, a brake drum carried by the shaft for rotation therewith and held by the housing against reciprocation with the shaft, a brake band about the drum and held in the housing against rotation about the drum, the band having a radial bore threaded at its outer end, a brake shoe in the inner part of the bore, a member threaded in the outer part of the bore and extending outside the housing, and a handle secured to the protruding end of the threaded member to oscillate it and vary the friction between the drum and brake shoe and band and thereby vary the line tension required to pull line off the spool.

5. A line control as claimed in claim 4, wherein the threaded member has a polygonal outer end and the handle has a correspondingly shaped socket to fit the said end in a plurality of positions.

References Cited in the file of this patent

UNITED STATES PATENTS

| 408,291 | Bullard | Aug. 6, 1889 |
| 2,548,073 | Siegrist | Apr. 10, 1951 |
| 2,604,273 | Hayes | July 22, 1952 |

FOREIGN PATENTS

| 577,244 | Great Britain | May 10, 1946 |
| 1,020,118 | France | Nov. 12, 1952 |